US008811380B2

(12) United States Patent
Takeuchi

(10) Patent No.: US 8,811,380 B2
(45) Date of Patent: Aug. 19, 2014

(54) IP TELEPHONE DEVICE, IP TELEPHONE SYSTEM, AND SETTING CONFIRMATION METHOD

(75) Inventor: Koji Takeuchi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 988 days.

(21) Appl. No.: 12/636,273

(22) Filed: Dec. 11, 2009

(65) Prior Publication Data
US 2010/0157988 A1 Jun. 24, 2010

(30) Foreign Application Priority Data

Dec. 19, 2008 (JP) ................................ 2008-323261

(51) Int. Cl.
*H04L 12/66* (2006.01)

(52) U.S. Cl.
USPC .......................................................... 370/352

(58) Field of Classification Search
None
See application file for complete search history.

(56) References Cited

U.S. PATENT DOCUMENTS

| 6,847,704 | B1* | 1/2005 | Cherchali et al. | 379/93.05 |
| 7,746,848 | B2* | 6/2010 | Hakusui | 370/352 |
| 2003/0039238 | A1* | 2/2003 | Ollis et al. | 370/352 |
| 2004/0264439 | A1* | 12/2004 | Doherty et al. | 370/352 |
| 2006/0153171 | A1* | 7/2006 | Sakai | 370/352 |
| 2007/0008950 | A1* | 1/2007 | Yamada | 370/352 |
| 2007/0156850 | A1* | 7/2007 | Corrion | 709/219 |
| 2009/0003323 | A1* | 1/2009 | Ishibashi | 370/352 |
| 2009/0003562 | A1* | 1/2009 | Inada | 379/93.05 |
| 2009/0280789 | A1* | 11/2009 | Takuno et al. | 455/418 |
| 2012/0213160 | A1* | 8/2012 | Ezrol et al. | 370/328 |

FOREIGN PATENT DOCUMENTS

| JP | 5-83383 A | 4/1993 |
| JP | 2005277694 A | 10/2005 |
| JP | 2006100967 A | 4/2006 |
| JP | 2006339803 A | 12/2006 |
| JP | 2008135919 A | 6/2008 |

OTHER PUBLICATIONS

Japanese Office Action for JP2008-32320 issued Jan. 19, 2011.

* cited by examiner

*Primary Examiner* — Minh-Trang Nguyen
(74) *Attorney, Agent, or Firm* — Sughrue Mion, PLLC

(57) ABSTRACT

An IP telephone system comprises a main device that manages outgoing and incoming calls of an IP telephone device, an external storage device storing network configuration information and telephone device configuration information, and an IP telephone device comprising a first interface section that uses in connection to the external storage device and a second interface section that uses in connection to a network. When automatically carrying out internal setting by connecting the external storage device to the first interface section, the IP telephone device obtains the network configuration information and the telephone device configuration information from the external storage device and, based on the obtained network configuration information and telephone device configuration information, carries out network setting and telephone device setting. The IP telephone device accesses the main device through the second interface section based on the setting and performs confirmation of the set contents.

20 Claims, 5 Drawing Sheets

| EXTENSION NUMBER | IP ADDRESS | GATEWAY ADDRESS | SUBNET MASK | TELEPHONE DEVICE CONFIGURATION INFORMATION | TELEPHONE SYSTEM SERVER ADDRESS | REGISTRATION FLAG |
|---|---|---|---|---|---|---|
| 0001 | | | CONFIGURATION DATA A | | | 0 |
| 0002 | | | CONFIGURATION DATA B | | | 0 |
| 0003 | | | CONFIGURATION DATA C | | | 0 |
| 0005 | | | CONFIGURATION DATA D | | | 0 |
| 0006 | | | CONFIGURATION DATA E | | | 0 |

NETWORK CONFIGURATION INFORMATION

TELEPHONE DEVICE CONFIGURATION INFORMATION

REGISTRATION FLAG 1: REGISTERED 0: UNREGISTERED

FIG. 3

| EXTENSION NUMBER | IP ADDRESS | MAC ADDRESS | OTHER IP TELEPHONE DEVICE DATA |
|---|---|---|---|
| IP TELEPHONE DEVICE DATA F ||||
| IP TELEPHONE DEVICE DATA G ||||
| IP TELEPHONE DEVICE DATA H ||||
| IP TELEPHONE DEVICE DATA I ||||
| IP TELEPHONE DEVICE DATA J ||||

FIG. 4

IP TELEPHONE DEVICE, IP TELEPHONE SYSTEM, AND SETTING CONFIRMATION METHOD

This application is based upon and claims the benefit of priority from Japanese patent application No. 2008-323261, filed on Dec. 19, 2008, the disclosure of which is incorporated herein in its entirety by reference.

TECHNICAL FIELD

This invention relates to an IP (Internet Protocol) telephone system and, in particular, relates to setting of an IP telephone device and a confirmation method thereof.

BACKGROUND ART

In business, use has recently been made of an IP telephone system in which a plurality of IP telephone devices (IP telephone terminals) are managed by a main device.

Using a database about the managing IP telephone devices in the IP telephone system, the main device, for example, manages outside-line and extension outgoing and incoming calls and offers a telephone book function and a speed dial function. For the IP telephone system using such a main device, an administrator (creator) or the like is required to set many configurations when introducing (setting up) the IP telephone system, adding an IP telephone device, changing configurations of the IP telephone device, or the like.

Techniques about IP telephone systems are described in Patent Documents 1 and 2.

Patent Document 1 describes IP telephone devices each having an interface section for use in connection to a LAN (Local Area Network) and an IP telephone system to which such IP telephone devices are connected. Patent Document 1 describes that network setting of the IP telephone devices, registration of the IP telephone devices to a managing device (main device), and initial setting (internal setting) of the IP telephone devices are essential (see paragraphs [0003] to [0005]).

Patent Document 2 describes an IP telephone system in which an IP telephone device automatically acquires network configurations from a server group and sets the acquired network configurations. Patent Document 2 describes a main device that accommodates a plurality of IP telephone devices and conducts exchange with an outside line.

The IP telephone systems described in Patent Documents 1 and 2 both assign an IP address to each IP telephone device using the DHCP (Dynamic Host Configuration Protocol). On the other hand, there is currently an IP telephone system that uses fixed IP addresses without using the DHCP.

Patent Document 1: Japanese Unexamined Patent Application Publication (JP-A) No. 2005-277694
Patent Document 2: Japanese Unexamined Patent Application Publication (JP-A) No. 2006-339803

SUMMARY

A general IP telephone system has the following problem in its introduction:

For setup and connection of IP telephone devices, an administrator is required to manually set many network configurations of the IP telephone devices one by one. That is, in order to connect the IP telephone devices to a network, location information (IP addresses, gateway addresses, etc.) of a network management server such as a DHCP server and an IP telephone device management server such as a main device, and so on are required to be set in the IP telephone devices as network configuration information. Further, it is also necessary to set network IDs and passwords in the IP telephone devices if necessary.

Therefore, Patent Document 1 describes carrying out network setting using a DHCP server. Further, in the IP telephone system of Patent Document 2, network setting and so on are implemented using a DHCP server and an FTP (File Transfer Protocol) server.

However, in the IP telephone systems described in Patent Documents 1 and 2, fixed IP addresses cannot be used because the DHCP is used. Further, it is not possible to accurately set a subnet mask, a DNS (Domain Name System), or the like per IP telephone device.

Further, since the JP telephone devices, extension numbers, and so on are artificially assigned using a personal computer or the like, there is a problem of an increase in probability of artificial erroneous setting as the set-up number of IP telephone devices increases.

Under these circumstances, this invention aims to provide an IP telephone system that can automatically implement detailed network setting of an IP telephone device that is connected to the IP telephone system.

Further, this invention aims to provide an IP telephone system that can easily carry out setting of an IP telephone device that is connected to the IP telephone system and confirmation of such setting.

According to an aspect of this invention, an IP telephone device connected through a network to a main device that manages outgoing and incoming calls is provided. The IP telephone device comprises a first interface section that uses in connection to an external storage device, a second interface section that uses in connection to the network, and a control section that performs, when carrying out internal setting, a setting process by obtaining network configuration information and telephone device configuration information from the external storage device storing the network configuration information and the telephone device configuration information and connected to the IP telephone device through the first interface section. The control section accesses the main device through the second interface section based on the set network configuration information and performs confirmation of the set contents.

According to another aspect of this invention, an IP telephone system is provided. The IP telephone system comprises a main device that manages outgoing and incoming calls of an IP telephone device connected to a network, using a telephone system database storing and managing configurations of a plurality of telephone devices, an external storage device storing network configuration information and telephone device configuration information, and the IP telephone device comprising a first interface section that uses in connection to the external storage device and a second interface section that uses in connection to the network. When automatically carrying out internal setting by connecting the external storage device to the first interface section, the IP telephone device obtains the network configuration information and the telephone device configuration information from the external storage device and, based on the obtained network configuration information and telephone device configuration information, carries out network setting and telephone device setting. Then the IP telephone device accesses the main device through the second interface section based on the setting and performs confirmation of the set contents.

According to still another aspect of this invention, a method of confirming setting of an IP telephone device is provided. The IP telephone device is connectable to an external storage device that uses in an IP telephone system comprising a main device that manages outgoing and incoming calls. The method comprises, when carrying out internal setting by connecting the external storage device storing network configuration information and telephone device configuration information to the IP telephone device, obtaining the network configuration information and the telephone device configuration information from the external storage device, carrying out network setting and telephone device setting based on the obtained network configuration information and telephone device configuration information, and accessing the main device based on the setting to perform confirmation of the set contents.

According to the above-mentioned aspects of this invention, it is possible to automatically implement detailed network setting of an IP telephone device that is connected to an IP telephone system.

Further, according to the above-mentioned aspects of this invention, it is possible to easily carry out setting of an IP telephone device that is connected to an IP telephone system and confirmation of such setting.

BRIEF DESCRIPTION OF THE DRAWINGS

FIG. 3 is a diagram visibly showing a table structure of a configuration database shown in FIG. 1;

FIG. 4 is a diagram visibly showing a table structure of a telephone device database shown in FIG. 1.

BEST MODE FOR CARRYING OUT THE INVENTION

An embodiment of this invention will be described with reference to FIGS. 1 to 5.

Figure 1:
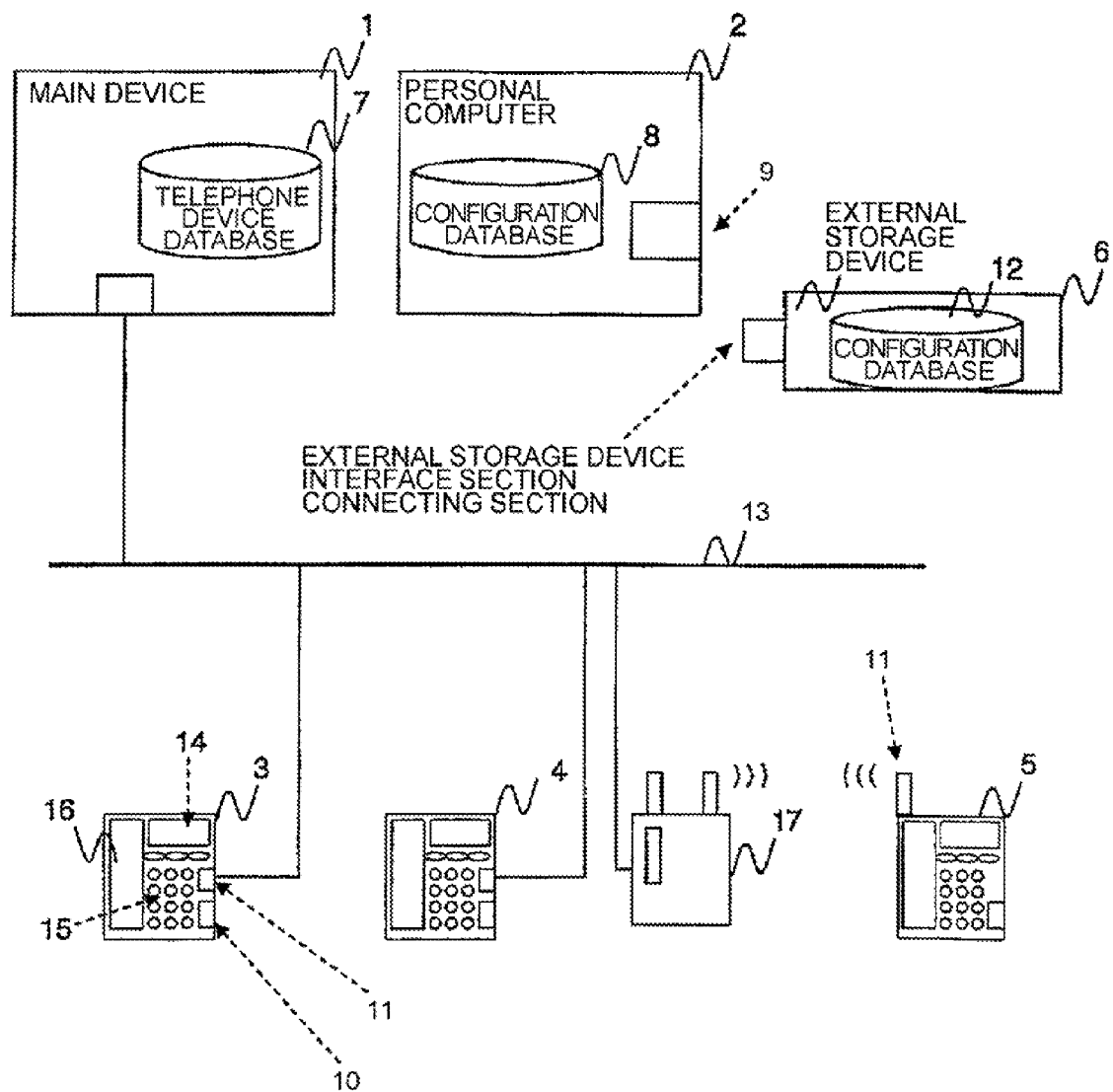
FIG. 1 is a diagram for explaining a schematic structure of an IP telephone system according to an embodiment of this invention.

FIG. 1 is a diagram showing a schematic structure of an IP telephone system according to the embodiment of this invention. Referring to FIG. 1, the IP telephone system according to this embodiment comprises a main device 1, a personal computer 2, IP telephone devices 3 to 5, and an external storage device 6. The IP telephone system may further comprises a radio base station 17.

The main device 1 includes a telephone device database 7 containing telephone device configuration information and registration information and manages the IP telephone devices connected thereto through an IP telephone system network 13. Both physical and logical connections are required for the connection to the IP telephone system network 13. Network setting is required for the logical connection.

The IP telephone system network 13 may be constructed by a wired or wireless LAN or by another network that can realize the IP telephony. Alternatively, it may be constructed by a mixture of wired and wireless connections as shown in FIG. 1.

For individually managing the connected IP telephone devices, the telephone device database 7 stores a lot of information such as extension numbers, IP addresses, and MAC (Media Access Control) addresses of the IP telephone devices and other IP telephone device data. The other IP telephone device data include, for example, type, option setting, user information, and speed dial setting of the IP telephone devices.

The personal computer 2 includes a configuration database 8 and, using this configuration database 8, edits and manages network configuration information, telephone device configuration information, and so on of the IP telephone device group connected to the IP telephone system. The personal computer 2 has an external storage device interface section 9. The external storage device interface section 9 is an interface conforming to a standard, for example, a USB standard or an SD card standard, of an external storage device to be used.

The network configuration information is configuration information necessary for network connection per IP telephone device, such as, for example, a host name, an IP address, a gateway address, a subnet mask, a protocol, a port number, and a DNS address.

The telephone device configuration information is information set for each IP telephone device and used in the IP telephone system, i.e. configuration information that makes various functions effective, such as, for example, an extension number, an address of a telephone system server for connection of the IP telephone device to the IP telephone system, an authentication ID, a password, option setting, user information, and speed dial setting. A MAC address of each IP telephone device may also be recorded.

The configuration database 8 is prepared by an administrator of the IP telephone system using the personal computer 2.

The external storage device 6 is an external storage device in conformity with the standard of the external storage device interface section 9. The external storage device 6 has a storage area (not illustrated) in which data of the configuration database 8 can be copied as a configuration database 12. As the storage area, there is prepared a storage area whose recordable data size is greater than the size of the configuration database 8 of the personal computer 2. The configuration database 12 as a copy of the configuration database 8 is stored in the storage area.

By copying the configuration database 8 prepared by the personal computer 2 into the storage area, the external storage device 6 makes it easy to carry the configuration contents as the configuration database 12 and makes it possible to access the configuration contents from the IP telephone devices.

The external storage device 6 is preferably an external storage device using, for example, a flash memory such as a USB memory or an SD card. However, as the external storage device, it is alternatively possible to use a HDD or an external storage device in conformity with a short-distance wireless communication standard (e.g. Bluetooth (registered trademark) or IrDA (Infrared Data Association)). The external storage device 6 is not limited to a general-purpose one. For example, it may be an existing standard one with a connector shape changed. In this case, external storage device interface sections of the IP telephone device group may also be changed correspondingly.

The IP telephone device 3 has an external storage device interface section 10 as a first interface section for use in connection to the external storage device 6 and a network interface section 11 as a second interface section for use in connection to the network. The IP telephone device 3 is connectable to the external storage device 6 through the first interface section 10 and accessible to the configuration database 12 of the connected external storage device 6.

The IP telephone device 3 has a handset 16, a display section 14 using a liquid crystal screen or the like, and an input/output section such as an operating section 15 using buttons or the like. The IP telephone devices 4 and 5 are IP telephone devices each having an external storage device interface section in the same manner as the IP telephone device 3.

Figure 2:
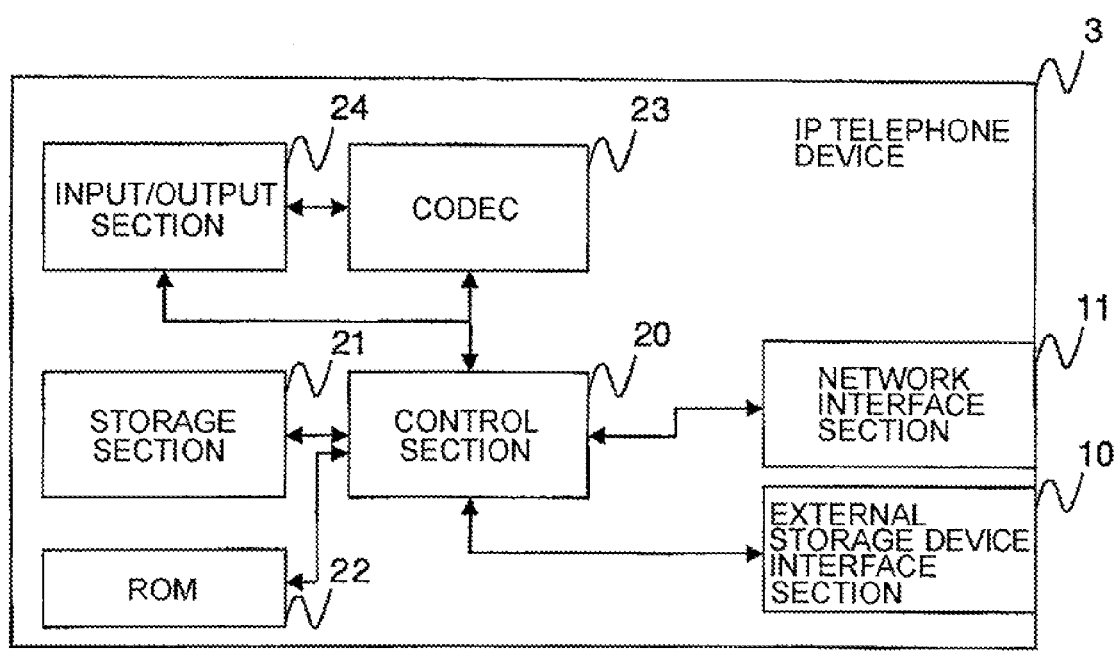
FIG. 2 is a functional block diagram for explaining a structure of an IP telephone device shown in FIG. 1.

FIG. 2 is a functional block diagram showing the structure of the IP telephone device 3.

The IP telephone device 3 comprises a control section 20 that performs various arithmetic processes and controls, a storage section 21 that stores information, the external storage device interface section 10, and the network interface section 11. Like a general IP telephone, the IP telephone device 3 further comprises a ROM (Read Only Memory) 22, a codec 23, and an input/output section 24.

When carrying out internal setting of the IP telephone device at the time of introducing the IP telephone system, relocating the IP telephone device, or the like, the control section 20 accesses the configuration database 12, storing the network configuration information, the telephone device configuration information, and so on, of the external storage device 6 connected to the external storage device interface section 10 to obtain information from the configuration database 12 and, based on the obtained information, records configuration information in the storage section 21, thereby performing a setting process.

Thereafter, the control section 20 accesses the main device 1 through the network interface section 11 based on the set network configuration information and performs confirmation of the set contents.

In this event, if a registration flag is provided along with the network configuration information and the telephone device configuration information in the external storage device 6, the control section 20 may refer to the registration flag to carry out the internal setting using unregistered information.

As the confirmation of the set contents that is performed by accessing the main device 1, the control section 20 may notify the set telephone device configuration information and so on to the main device 1.

In this event, if the configuration contents such as the extension number of the newly connected IP telephone device 3 are not yet registered in the telephone device database 7, the main device 1 registers the configuration contents and transmits a registration completion signal to the registered IP telephone device 3.

The IP telephone device 3 in receipt of the registration completion signal accesses the external storage device 6 to set a registration completion flag as a registration flag for its own extension number item in the configuration database 12 and displays in the display section 14 that the setting of the IP telephone device has been completed. Thereafter, when the external storage device 6 is detached, the IP telephone device 3 starts an operation as an IP telephone based on the set information.

On the other hand, if the configuration contents (extension number, IP address, etc.) of the IP telephone device 3 newly connected to the main device 1 are already registered in the telephone device database 7 by another IP telephone device, the main device 1 notifies the IP telephone device 3 of the presence of the interfering IP telephone device. As one example, if the interfering IP telephone device is registered, the main device 1 transmits information of the registered IP telephone device stored in the telephone device database 7 to the IP telephone device 3.

Alternatively, as the confirmation of the set contents that is performed by accessing the main device 1, the control section 20 may refer to the telephone system database (telephone device database 7) stored in the main device 1 to confirm whether or not interfering registration data is present.

If the interfering IP telephone device is present as a result of the confirmation of the setting, the control section 20 may initialize the set network configuration information and telephone device configuration information.

For example, when the information of the interfering IP telephone device is received from the main device 1 as described above, the IP telephone device 3 displays the network configuration data of the registered IP telephone device in the display section 14 and simultaneously displays in the display section 14 whether the setting of the registered IP telephone device shall be "reset" or "maintained" to allow an operator to select one of them using the operating section 15. If "maintained" is selected, the configuration information of the IP telephone device 3 is reset to the initial state. Then, the IP telephone device 3 may again allow the operator to select whether to manually set network configurations and so on or automatically carry out other setting based on the configuration database 12.

On the other hand, if "reset" is selected, the IP telephone device 3 may send a request signal to the main device 1 to request resetting the registered IP telephone device.

That is, if the interfering IP telephone device is present as a result of the confirmation of the setting, the control section 20 may notify the main device 1 of a request to initialize the setting of the registered IP telephone device as the interfering IP telephone device.

In this event, the main device 1 in receipt of the request signal transmits a setting reset signal to the relevant IP telephone device (IP telephone device to be reset) and simultaneously clears the corresponding IP telephone device information in the telephone device database 7. In this event, the IP telephone device in receipt of the setting reset signal resets the specified internal setting.

After transmitting the reset signal, the main device 1 notifies the IP telephone device 3 of a signal indicative of reset completion.

The IP telephone device 3 in receipt of the signal indicative of reset completion displays in the display section 14 that the relevant IP telephone device is reset and setting of the IP telephone device 3 is completed. Further, the IP telephone device 3 accesses the external storage device 6 to set a registration completion flag as a registration flag for its own configuration contents in the configuration database 12.

Thereafter, when the external storage device 6 is detached, the IP telephone device 3 starts an operation as an IP telephone based on the set information.

Herein, the operation of the IP telephone device 3 will be described in the case of introducing the IP telephone system.

When introducing the IP telephone system, by copying the configuration database 8 prepared by the personal computer 2 into the storage area of the external storage device 6 as the configuration database 12, the IP telephone device 3 can refer to the configuration database 12 of the external storage device 6 and, based on it, carry out internal setting thereof.

The IP telephone device 3 to which the external storage device 6 is connected is allowed to select whether to manually carry out network setting or automatically carry out network setting based on the configuration database 12. If the manual setting is selected by an operator using the operating section 15, the IP telephone device 3 performs a setting process to set network configurations such as an IP address according to information manually input through the operating section 15.

On the other hand, if the automatic setting is selected, the IP telephone device 3 carries out internal setting of configuration contents recorded in the configuration database 12. If a plurality of different configuration contents are recorded in the configuration database 12, the operator may be allowed to make a selection.

As one example, if the automatic network setting is selected, the IP telephone device 3 confirms a registration flag for an extension number, that agrees with an extension number input through the operating section 15 (an extension number specified by the operator), present in the configuration database 12 of the external storage device 6 and, if not registered, automatically obtains corresponding configuration contents (network configuration information and telephone device configuration information) and sets and stores them in the storage section 21. On the other hand, if the extension number is registered, the IP telephone device 3 displays in the display section 14 that the input extension number is already registered, and returns to the selection of whether to manually or automatically carry out network setting.

Instead of the extension number specified by the operator, the network setting may be automatically carried out based on a MAC address of the IP telephone device 3.

The IP telephone device 3 finished with the network setting according to the above-mentioned operation is connected to the network and to the main device 1 of the IP telephone system to perform confirmation of the contents. Also in this event, the external storage device 6 is connected to the IP telephone device 3.

The IP telephone device 3 confirms whether or not there is a discrepancy between the telephone device database 7 and the configuration database 12 and reflects the results in the configuration database 12. In this event, if there is a discrepancy between the telephone device database 7 and the configuration database 12, the IP telephone device 3 may be operated to send a command for invalidating the configuration data to an IP telephone device with the discrepancy in the main device 1 to remove the discrepancy, or to initialize its own setting to remove the discrepancy.

By again connecting the external storage device 6 to the personal computer 2, the configuration database 12 subjected to a change in registration completion flag can be copied into the configuration database 8 of the personal computer 2 and thus can be used for managing the setting conditions by the personal computer 2.

Herein, the embodiment will be described by showing examples of the configuration database 8 and the telephone device database 7.

FIG. 3 is a diagram visibly showing a table structure of the configuration database 8. As shown in FIG. 3, the configuration database 8 stores network configuration information and telephone device configuration information mapped to extension numbers. Registration flag items are provided for the extension numbers, respectively, wherein an initial value is set to "0" and a used extension number is set to "1".

In the example shown in FIG. 3, the configuration contents of the extension numbers 0001, 0002, 0003, 0005, and 0006 are shown with a registration flag set to "0".

FIG. 4 is a diagram visibly showing a table structure of the telephone device database 7. As shown in FIG. 4, the telephone device database 7 stores extension numbers, IP addresses, MAC addresses, and other IP telephone device data of IP telephone devices connected to the main device 1.

In the embodiment described above, an extension number is used as a reference parameter in the telephone device database 7, the configuration database 8, and the configuration database 12, but another item may be used as a reference parameter instead of the extension number. As another reference item, use may be made of, for example, a fixed IP address, a MAC address, a number of configuration data, or the like.

Next, the operation of the overall IP telephone system will be described by showing an operation example of the IP telephone device 3 at the time of setting thereof. In this operation example, the database information shown in FIGS. 3 and 4 is used.

Figure 5:
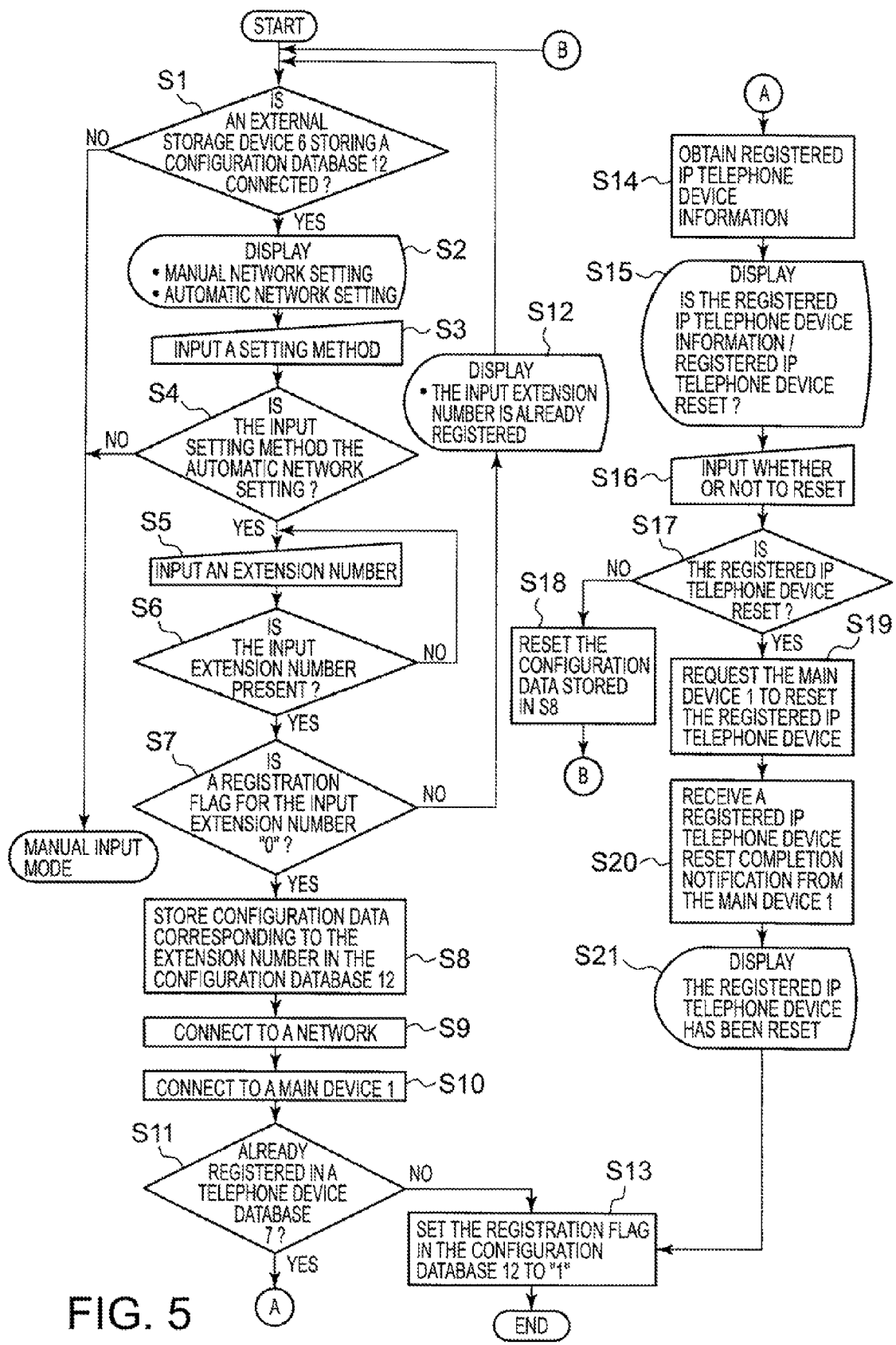
FIG. 5 is a flowchart for explaining an operation, in setting, of the IP telephone device shown in FIG. 1.

FIG. 5 is a flowchart showing an operation, in setting, of the IP telephone device 3. The IP telephone device 3 starts a setting process in response to an operation by an operator.

After starting the setting process, the IP telephone device 3 judges in step S1 whether or not the external storage device 6 shown in FIG. 1 is connected thereto. In this event, so as not to start the setting process even if an irrelevant external storage device (an external storage device storing no configuration database) is connected, the IP telephone device 3 makes a judgment also taking into account the presence of the configuration database 12 in the external storage device.

If the external storage device 6 is not connected (NO in step S1), the IP telephone device 3 shifts to a manual input mode and finishes an automatic setting process.

If the external storage device 6 is connected (YES in step S1), the IP telephone device 3 proceeds to steps S2 and S3 and allows the operator to select whether to automatically or manually carry out network setting. In the case of automatically carrying out the network setting, the operator inputs "automatic network setting" into the IP telephone device 3 in step S3.

If "manual network setting" is selected in step S4 (NO in step S4), the IP telephone device 3 shifts to the manual input mode and finishes the automatic setting process. On the other hand, "automatic network setting" is selected in step S4 (YES in step S4), the IP telephone device 3 proceeds to step S5 and allows the operator to input an extension number of the IP telephone device 3 intended to be set.

The IP telephone device 3 judges in step S6 whether or not the input extension number is present in the configuration database 12 of the external storage device 6.

If the input extension number is not present (NO in step S6), the IP telephone device 3 returns to the extension number process of step S5, while, if the input extension number is present (YES in step S6), the IP telephone device 3 proceeds to a next process.

If the input extension number is present, the IP telephone device 3 confirms a registration flag in the configuration database 12 in step S7. If the registration flag for the input extension number is "1" (NO in step 7), the IP telephone device 3 displays that the input extension number is already registered (step S12), and returns to the start of the process, i.e. step S1. On the other hand, if the registration flag for the input extension number is "0" (YES in step S7), the IP telephone device 3 proceeds to step S8 and stores configuration data corresponding to the extension number in the configuration database 12 into the storage section 21, and then implements network connection setting in step S9.

In step S10, using the configuration data (e.g. a telephone system server address), the IP telephone device 3 connects it (notifies completion of the network setting) to the main device 1. Depending on need, the IP telephone device 3 transmits telephone device configuration information (internally set contents) that will be necessary for investigation.

In response to the connection of the IP telephone device 3, the main device 1 refers to the telephone device database 7, investigates (confirms) whether or not the extension number and so on set by the IP telephone device 3 are already registered, and notifies the results to the IP telephone device 3. The investigation (confirmation) is satisfactory if, when telephone device configuration information expected to be registered is registered in advance in the telephone device database 7, the telephone device configuration information actually registered in the IP telephone device 3 and transmitted from the IP telephone device 3 wholly or partly coincides with the telephone device configuration information registered in advance in the telephone device database 7 (i.e. adequacy is ensured).

In this event, if the configuration data such as the extension number of the newly connected IP telephone device 3 is not yet registered in the telephone device database 7, the main device 1 registers it as it is and transmits a registration completion signal to the registered IP telephone device 3. Alternatively, the IP telephone device 3 may directly access the telephone device database 7 to carry out the investigation (confirmation).

If no registration is present in the telephone device database 7 as a result of the investigation (confirmation) in step S11 (NO in step S11), the IP telephone device 3 proceeds to step S13 and changes the registration flag for the set extension number in the configuration database 12 to "1", thereby finishing the automatic setting process.

On the other hand, if the extension number and so on are already registered in the telephone device database 7 (YES in step S11), the IP telephone device 3 proceeds to step S14.

In step S14, the IP telephone device 3 obtains the registered IP telephone device information from the main device 1 and displays the obtained information in the display section 14.

In step S15, the IP telephone device 3 performs a display for a selection of whether or not to reset the setting of the registered IP telephone device. In step S16, the IP telephone device 3 receives a selection, by the operator, of whether or not to reset, and in step S17, judges whether or not to reset.

In this event, the operator judges whether or not to reset the setting of the registered IP telephone device and inputs a decision.

If the reset is not performed (NO in step S17), the IP telephone device 3 proceeds to step S18, resets the configuration data stored in step S8, and returns to the start of the process, i.e. step S1.

On the other hand, if the reset is performed (YES in step S17), the IP telephone device 3 proceeds to step S19 and notifies the main device 1 of a request for resetting the setting of the registered IP telephone device.

When the main device 1 resets the setting of the registered IP telephone device based on the request, the main device 1 transmits its results to the IP telephone device 3. Accordingly, the IP telephone device 3 receives the results in step S20, notifies the operator of the reset of the setting of the registered IP telephone device in step S21, and proceeds to step S13.

In step S13, the IP telephone device 3 sets the registration flag corresponding to the configuration data, stored in step S8, in the configuration database 12 to "1", thereby finishing the automatic setting process.

As described above, according to the IP telephone system of this embodiment, setting of an IP telephone device can be easily carried out by storing configuration contents (data) in the external storage device 6 and inputting network configurations of the IP telephone device from the external storage device 6.

Further, checking is performed to prevent overlapping of configurations to be registered in the main device 1 so that configuration data of a specific IP telephone device can be invalidated, and therefore, it is possible to carry out management of configuration data easily and without error.

Accordingly, when artificially assigning extension numbers and so on to IP telephone devices, it is possible to prevent a registration otherwise caused by erroneous setting that increases as the set-up number of IP telephone devices increases. In addition, it is possible to easily correct the erroneous setting.

Further, since it is possible to carry out network setting without using the DHCP, detailed setting such as, for example, setting of fixed IP addresses or setting of a subnet mask per floor is enabled.

As described above, according to the embodiment of this invention, since network configuration information is stored in an external storage device in the form of a database, an IP telephone device having an external storage device interface section can easily refer to the database, thereby carrying out network setting and telephone device setting.

Further, since registration data in a telephone device database of a main device and configuration data of an IP telephone device are compared to each other, it is possible to prevent overlapping of network configurations.

Further, since a flag in a database referred to by an IP telephone device for network setting is changed, it is possible to prevent overlapping of internal configurations.

Further, since a flag in a database is changed, it is possible to easily manage the telephone device setup conditions from a personal computer at the time of introducing an IP telephone system, or the like.

That is, according to this invention, it is possible to provide an IP telephone system that can automatically implement detailed network setting of an IP telephone device that is connected to the IP telephone system.

Further, according to this invention, it is possible to provide an IP telephone system that can easily carry out setting of an IP telephone device that is connected to the IP telephone system and confirmation of such setting.

In the foregoing description, after an external storage device is inserted into a slot, an IP telephone device manually or automatically starts setting according to a selection made by an operator. However, the IP telephone device may automatically start setting upon recognition that the external storage device is inserted into the slot.

Further, an IP telephone device may identify only a specific external storage device using a serial number or the like of the external storage device.

While this invention has been particularly shown and described with reference to an exemplary embodiment thereof, this invention is not limited to the embodiment. It will be understood by those of ordinary skill in the art that various changes in form and details may be made therein without departing from the spirit and scope of this invention as defined by the claims.

What is claimed is:

1. An IP telephone device connected through a network to a main device that manages outgoing and incoming calls, said IP telephone device comprising:
    a first interface section that uses in connection to an external storage device;
    a second interface section that uses in connection to the network; and
    a control section that performs, when carrying out internal setting, a setting process by obtaining network configuration information and telephone device configuration information from said external storage device storing the network configuration information and the telephone device configuration information and connected to said IP telephone device through said first interface section, the network configuration information and the telephone device configuration information being set as set network configuration information and set telephone device configuration information,
said control section accessing said main device through said second interface section based on the set network configuration information and performing confirmation of the set contents set by the setting process.

2. The IP telephone device according to claim 1, wherein if a registration flag is provided along with the network configuration information and/or the telephone device configuration information in said external storage device, said control section refers to said registration flag to carry out internal setting of unregistered network configuration information and/or unregistered telephone device configuration information.

3. The IP telephone device according to claim 1, wherein, as the confirmation of the set contents that is performed by accessing said main device, said control section notifies the set telephone device configuration information to said main device.

4. The IP telephone device according to claim 1, wherein, as the confirmation of the set contents that is performed by accessing said main device, said control section refers to a telephone system database stored in said main device to confirm whether or not interfering registration data is present.

5. The IP telephone device according to claim 1, wherein if an interfering IP telephone device is present as a result of the confirmation of the contents, said control section initializes the set network configuration information and/or telephone device configuration information.

6. The IP telephone device according to claim 1, wherein if an interfering IP telephone device is present as a result of the confirmation of the contents, said control section notifies said main device of a request to initialize setting of said interfering IP telephone device (registered IP telephone device).

7. The IP telephone device according to claim 1, wherein
said first interface section is an interface section for connection to an external storage device using a flash memory, and
said second interface section is an interface section for connection to a wired or wireless LAN.

8. An IP telephone system comprising:
a main device that manages outgoing and incoming calls of an IP telephone device connected to a network, using a telephone system database storing and managing configurations of a plurality of telephone devices;
an external storage device storing network configuration information and telephone device configuration information; and
the IP telephone device comprising a first interface section that uses in connection to said external storage device and a second interface section that uses in connection to the network,
wherein when automatically carrying out internal setting by connecting said external storage device to said first interface section, said IP telephone device obtains the network configuration information and the telephone device configuration information from said external storage device and, based on said obtained network configuration information and telephone device configuration information, carries out network setting and telephone device setting, the network configuration information and the telephone device configuration information being set as set network configuration information and set telephone device configuration information, and
said IP telephone device accesses said main device through said second interface section based on the set network configuration information and performs confirmation of contents set by the network setting and the telephone device setting.

9. The IP telephone system according to claim 8, wherein if a registration flag is provided along with the network configuration information and/or the telephone device configuration information in said external storage device, said IP telephone device refers to said registration flag to carry out internal setting of unregistered network configuration information and/or unregistered telephone device configuration information, and
after completion of all automatic setting, said IP telephone device changes said registration flag to registered.

10. The IP telephone system according to claim 8, wherein, as the confirmation of the contents that is performed by accessing said main device, said IP telephone device notifies the set telephone device configuration information to said main device, and
said main device refers to the notified telephone device configuration information and information registered in said telephone system database and confirms whether or not an interfering IP telephone device is present.

11. The IP telephone system according to claim 8, wherein, as the confirmation of the contents that is performed by accessing said main device, said IP telephone device refers to said telephone system database stored in said main device to confirm whether or not an interfering IP telephone device is present.

12. The IP telephone system according to claim 8, wherein if an interfering IP telephone device is present as a result of the confirmation of the contents, said IP telephone device or said main device initializes the set network configuration information and/or telephone device configuration information.

13. The IP telephone system according to claim 8, wherein if an interfering IP telephone device is present as a result of the confirmation of the contents, said IP telephone device or said main device initializes setting of said interfering IP telephone device (registered IP telephone device).

14. The IP telephone system according to claim 8, wherein
said first interface section is an interface section for connection to an external storage device using a flash memory, and
said second interface section is an interface section for connection to a wired or wireless LAN.

15. A method of confirming setting of an IP telephone device connectable to an external storage device that uses in an IP telephone system comprising a main device that manages outgoing and incoming calls, the IP telephone device comprising a first interface section that uses in connection to said external storage device and a second interface section that uses in connection to the network, said method comprising:
when carrying out internal setting by connecting said external storage device storing network configuration information and telephone device configuration information to said IP telephone device through said first interface section,
obtaining the network configuration information and the telephone device configuration information from said external storage device;
carrying out network setting and telephone device setting based on said obtained network configuration information and telephone device configuration information, the network configuration information and the telephone device configuration information being set as set network configuration information and set telephone device configuration information; and accessing, through said second interface section, said main device based on the set network configuration information to perform confirmation of contents set by the network setting and the telephone device setting.

16. The method according to claim 15, wherein if a registration flag is provided along with the network configuration information and/or the telephone device configuration information in said external storage device, said IP telephone device refers to said registration flag to carry out internal setting of unregistered network configuration information and/or unregistered telephone device configuration information, and after completion of all automatic setting, said IP telephone device changes said registration flag to registered.

17. The method according to claim 15, wherein, as the confirmation of the set contents that is performed by accessing said main device, said IP telephone device notifies the set telephone device configuration information to said main device, and said main device refers to the notified telephone device configuration information and information registered in a database and confirms whether or not an interfering IP telephone device is present.

18. The method according to claim 15, wherein, as the confirmation of the contents that is performed by accessing said main device, said IP telephone device refers to a database stored in said main device to confirm whether or not an interfering IP telephone device is present.

19. The method according to claim 15, wherein if an interfering IP telephone device is present as a result of the confirmation of the contents, said IP telephone device or said main device initializes the set network configuration information and/or telephone device configuration information.

20. The method according to claim 15, wherein if an interfering IP telephone device is present as a result of the confirmation of the contents, said IP telephone device or said main device initializes setting of said interfering IP telephone device (registered IP telephone device).

\* \* \* \* \*